United States Patent [19]

Brillaud

[11] 4,146,039
[45] Mar. 27, 1979

[54] GRAIN THRESHER FOR CEREALS

[75] Inventor: Edmond Brillaud, Niort, France

[73] Assignee: Emile Marot, Niort, France

[21] Appl. No.: 807,295

[22] Filed: Jun. 16, 1977

[30] Foreign Application Priority Data

Jun. 18, 1976 [FR] France .................. 76 18533
Nov. 29, 1976 [FR] France .................. 76 35881
Mar. 3, 1977 [FR] France .................. 77 06192

[51] Int. Cl.² .................. A01F 12/00; A01F 12/44
[52] U.S. Cl. .................. 130/27 R; 130/27 HF; 130/DIG. 5
[58] Field of Search .................. 130/27 R, 6, 8, 24, 130/26, 27 HF, 27 M, 27 T, DIG. 5

[56] References Cited

U.S. PATENT DOCUMENTS

| 291,151 | 1/1884 | Clark | 130/DIG. 5 |
|---|---|---|---|
| 491,407 | 2/1893 | Davis | 130/DIGS. 5 |
| 572,086 | 11/1896 | Mannett | 130/27 R |
| 990,007 | 4/1911 | Reason | 130/27 T |
| 1,180,443 | 4/1916 | Schuette | 130/DIG. 5 |
| 1,184,999 | 5/1916 | Reason | 130/27 HF |
| 1,290,610 | 1/1919 | Luedke | 130/27 R |
| 1,297,349 | 3/1919 | Herr | 130/27 R |
| 1,420,593 | 6/1922 | Titchmarsh | 130/DIG. 5 |
| 1,887,817 | 11/1932 | Messinger | 130/27 M |
| 2,328,713 | 9/1943 | Doud et al. | 130/27 R |
| 2,351,567 | 6/1944 | Welty | 130/24 |
| 2,377,238 | 5/1945 | Jorg | 130/27 T |
| 2,644,284 | 7/1953 | Oberholtz et al. | 130/27 R |
| 2,718,110 | 9/1955 | Butler | 130/27 R |
| 2,732,941 | 1/1956 | Deiss | 130/DIG. 5 |

Primary Examiner—Russell R. Kinsey
Assistant Examiner—Paul J. Hirsch

[57] ABSTRACT

Cereal grain thresher comprising: a feeder, a thresher and counter-thresher unit, a recovery chamber for threshed grains, a rotary air lock mounted in said chamber, a straw-remover disposed beyond said rotary air lock controlled from a fan distributing a current of pulsed air in the opposite direction to the grain flow, and an elevator. In one embodiment the straw remover is formed by a rotary drum carried on a fixed shaft and whose surface is provided with perforations. The shaft supports a trough having mounted at the base thereof an endless screw parallel to the shaft. Between the rotary air lock and the straw-remover is disposed a vertically reciprocated shaker comb having teeth to cause the threshed ears to jump and thus to facilitate the flow of the grains.

7 Claims, 20 Drawing Figures

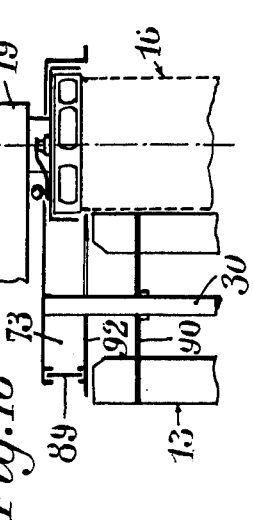
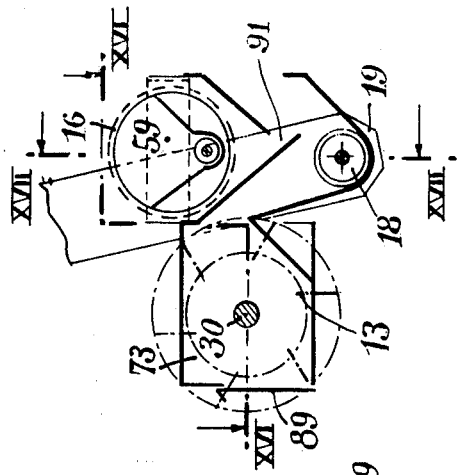
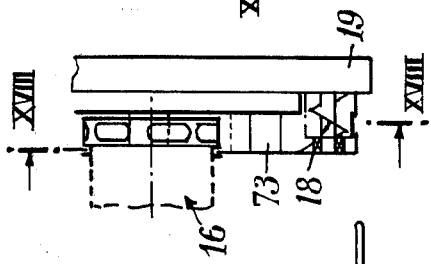
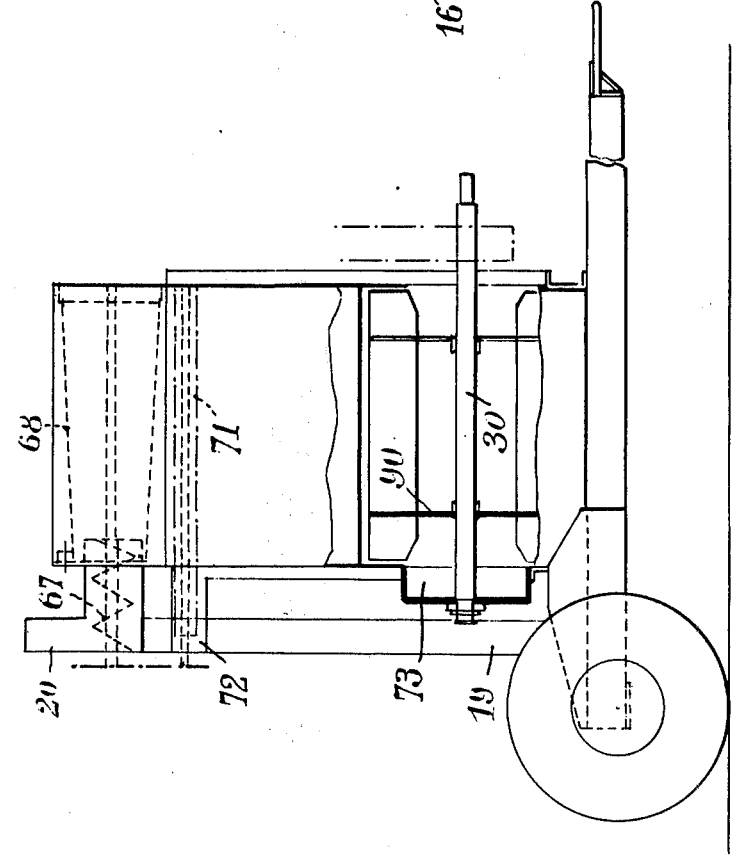

GRAIN THRESHER FOR CEREALS

BACKGROUND OF THE INVENTION

The present invention has as its object a grain thresher for cereals, and particularly for millet, sorgho, paddy and similar.

The shape of the ears of millet (souana-sanio), the lay-out of the grains on the rachis, the strength of the pedicels, the characteristics of the involucre are factors which must be taken into consideration in determining a threshing principle different from the conventional principles of threshers for cereals such as wheat, maize, oats barley etc...

A known process consists in directing the ears by means suction in front of a driving drum towards a thresher and counter-thresher unit where the ears rolling on themselves are progressively compressed between a fixed surface and a movable surface covered with an abrasive material such as expended metal, then towards a distributing paddle drum housed in a closed space where the coarse waste is separated, and finally on to a rotary sieve eliminating the straw and leaving the grains to flow towards the elevator screw against the flow of air in a ventilation passage with adjustable deflector.

A major disadvantage of such an installation is that the ears have a tendency to jam up between the routing drum and the thresher despite the ventilation; moreover, the ventilation towards the sieve is insufficient to eliminate all the waste.

SUMMARY OF THE INVENTION

The present invention concerns then an installation which mitigates these disadvantages.

This thresher comprises a thresher and counter-thresher unit which directs the grain received from a feeder and a presser in the counter-current of the blast from a blower towards a straw-remover which directs the straw towards a discharge shaft and which sorts the grains towards the chute of an elevator which delivers them into a bagging mouth, with possible interposition of a sifter.

According to an improvement, the latticed cylinder of the straw-remover rotates on bearings about a fixed axis mounted on self-lubricating bearings and on which is fixed a prismatic trough whose oblique sides are slopingly adjustable and which is fitted with an endless screw routing the separated grains towards a dust separater and towards the elevator screw.

The products passing through the straw-remover and collected in the trough are smoothly discharged on the opposite side to the screw drive towards the other end of the straw-remover designed such that the products exit therefrom through oblong apertures.

This new conception of the straw-remover avoids jam-ups due to the stalks of the ears sticking in the mesh between the straw-remover and the wall of separation between good products and waste in the machines known up to present, for, by gravity, these stalks fall naturally below the straw-remover.

This device separates very efficiently the pieces of stalks of the ears from the peduncles and good grain.

Between the exit from the straw-remover of the products recovered by the trough and their entry into the foot of the elevator, an optional device allows, by using the height between these two points and the partial vacuum of the blade fan, the biggest part of the semi-heavy products mixed with the good grains at the exit of the straw-remover to be removed.

This device is formed by a baffle suction box serving as a separator placed over one of the suction inlets of the blade fan and which forces a rotary air flow of products to be cleaned to be presented perpendicularly to an air-current which passes therethrough and which recovers in its passage products lighter than the good grains.

This suction box is fitted with a sliding gate for selectively adjusting the suction strength.

The blade fan is fitted with a disc separating the fan into two parts so that the adjustment of the strength of the air-current by opening one of the inlets has only a small reaction on the strength of the other side.

This separation disc reserves about a quarter of the length of the fan for the suction device for cleaning after straw removal and the remaining three-quarters for the suction device for discharging light products and ear stalks eliminated before the removal of the straw as well as the ear stalks and coarse waste refused by this latter.

The surrounding casing has been transformed so that, using the total power of the blast fan, this latter serves two purposes owing to the provision of an appropriate opening adjustable by means of a shutter.

Thus, on the one hand, the largest part of the air, by means of a discharge pipe foldable for transport by road, serves for removing to a certain distance the threshed waste falling under and behind the straw-remover.

On the other hand, a small part of the air of the fan which is adjustable in amount by means of the above-mentioned shutter, is used for separating the good grains and the waste during their flow between the lock and the straw-remover.

It was noted that the necessity of unhitching the machine from the tractor to allow this latter to drive the machine because of the transverse position of the general control shaft demanded considerable time and a particular technical knowledge for connecting the universal joint, as well as a quite considerable effort on the part of the personnel.

To overcome this disadvantage the wheels and the boom are disposed in planes parallel to those of the axes of the thresher and the fan so as to remain coupled to the universal joint not only in the road position but also in the word position and this is achieved without extra accessories, shafting or others.

The machine is then carried, on the one hand, by two wheels located on each side of the bagging station and by its boom resting on the tow-bar of the tractor.

This new arrangement simplifies enormously the work and economizes precious time in the work of putting the thresher into service.

According to another improvement, the grain elevator is elongated so that the products can be bagged directly or poured into an optional rotary sifter intended for separating by size the grains and the waste.

This rotary sifter is mounted between the exit of the elevator annd the double bagging mouth; it conditions the recycling in the thresher of badly threshed peduncles.

This sifter is carried and maintained in position at its head by three rollers mounted outwardly thereof, themselves rotatably mounted on shafts integral with the enclosure of the sifter.

This sifter is carried rearwardly by a cross-piece with off-set arms through which passes the central drive shaft which rotates it at the same time as itself by means of a direct-drive dog-clutch which is removable for facilitating the changing of the sifter.

This latter is in fact formed from a perforated metal sheet whose holes correspond to the work of sorting to be carried out and, according to the products, it is possible to use sifters with different perforations.

Clearing rollers resting on top of the sifter and driven thereby rotate about an axis and regularly clear the perforations which may be clogged by products of a size slightly larger than the perforations.

The products not passing through the perforations (badly threshed peduncles) of the sifter leave the end thereof and fall directly into the threshing chamber.

The products passing through the perforations (sorted good grains) are collected in a fixed trough in which rotates an endless screw driven by sprocket and chain like the central shaft of the sifter from the head shaft of the elevator.

This endless screw takes up these good sorted grains and directs them towards the double bagging mouth.

It has moreover been noted that the size of the threshed ears and the waste passing above the rotary straw-remover was such that the threshed grain appearing above these remains had not the time to pass through and so dropped with them at the rear of the machine.

To overcome this disadvantage there was disposed above the straw-remover a sort of shaker comb with horizontal slightly bent teeth on which passes the whole of the products leaving the rotary air lock. The teeth of this kind of comb vertically reciprocated make the threshed ears jump slightly and thus help the grains to pass through the mass of ears so that they can flow into the rotatry straw-remover.

The axis on which the teeth of the comb are fixed is located under the outlet chute of products from the lock. It is mounted, on bearings, on the sides of the machine and at one of its ends, an arm on which an excentric acts ensures the shaking movement of the teeth of the comb.

The shaking is of a more or less great amplitude depending on whether the drive point on the control arm is more or less distant from the supporting shaft of the rods.

The accompanying drawing shows several embodiments:

BRIEF DESCRIPTIONS OF THE DRAWINGS

FIG. 15 is a schematic end view of the whole.

FIG. 16 is a partial section according to line XVI—XVI of FIG. 18.

FIG. 17 is a vertical section along line XVII—XVII of FIG. 18; and

FIG. 18 is a vertical section along line XVIII—XVIII of FIG. 17.

Figure 19:
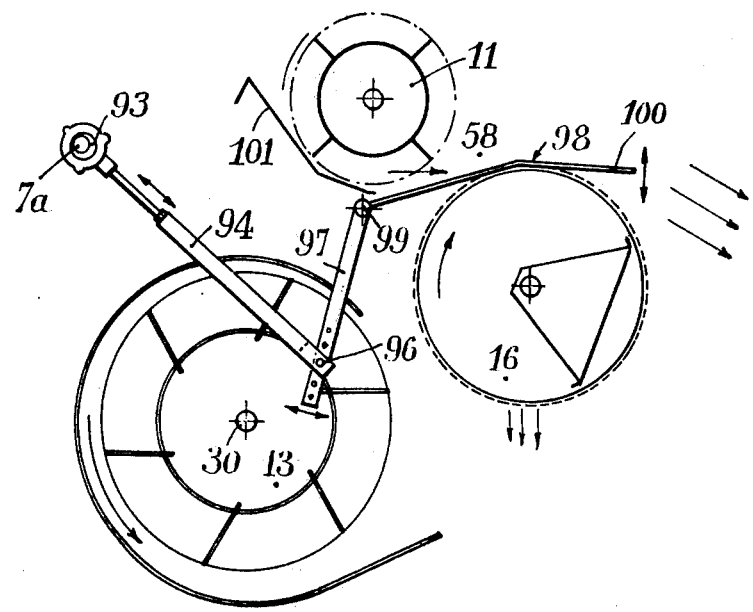
Figure 20:
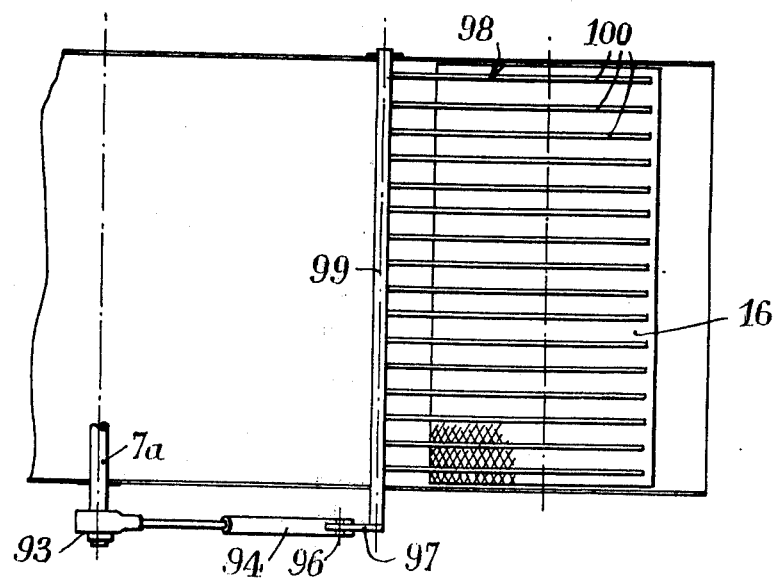

There is shown in elevation in FIG. 19 and in a top view in FIG. 20 of the accompanying drawings a shaker comb according to another improvement of the invention, inserted in the space between the rotary air lock and the straw-remover down-stream of the distributing chute.

DESCRIPTION OF THE PREFERRED EMBODIMENTS

The thresher shown in FIGS. 1 to 10 comprises a chassis 24 mounted on wheels 27 and a prop 28 supporting the work platform 25. The telescopic supply table 1 is aligned with a fixed supply table 2 which brings the grain into the distributing cylinder 3 or feeder with retractable fingers which will be described in more detail later. With this feeder is associated a presser cylinder 4 rotating in the same direction F. The ears are fed one by one and without jamming into space 29 between the thresher cylinder 7 and the movable part 8 of the fixed counter-thresher 9; the products not fed are delivered by presser 4 to a vertical chute 6.

The thresher is made of cast plating with an appropriate profile which will be described further on.

The threshed products emerge into the recovery chamber 10 comprising rotary air lock 11 and the decompression baffle 12 which leaves the enclosure at the atmospheric pressure.

In the lower part of this chamber underneath thresher 7 is housed a blade fan 13 with horizontal axis whose cylindrical surrounding casing 31 has on the outlet side a lower air distributing shutter 14 after which are disposed two orientating shutters 15 and 15a.

The fan blows, on the other hand, in an adjustable direction under straw-remover 16 rotating in direction $F_2$ contrary to that $F_1$ of the fan and receiving the grains distributed by the thresher and counter-thresher unit.

The fan blows, on the other hand, in an adjustable direction under a flat sieve disposed below the straw-remover. This flat sieve or winnower 17 supported by brackets 32 will be described in detail hereafter.

The grain sifted by the sieve falls by gravity on to the elevator screw 18 which feeds it into elevator 19.

20 designates the bagging mouth and 23 the dust outlet box.

The whole of these members is carried by frame 22 integral with chassis 24 towed by its boom.

Figure 5:
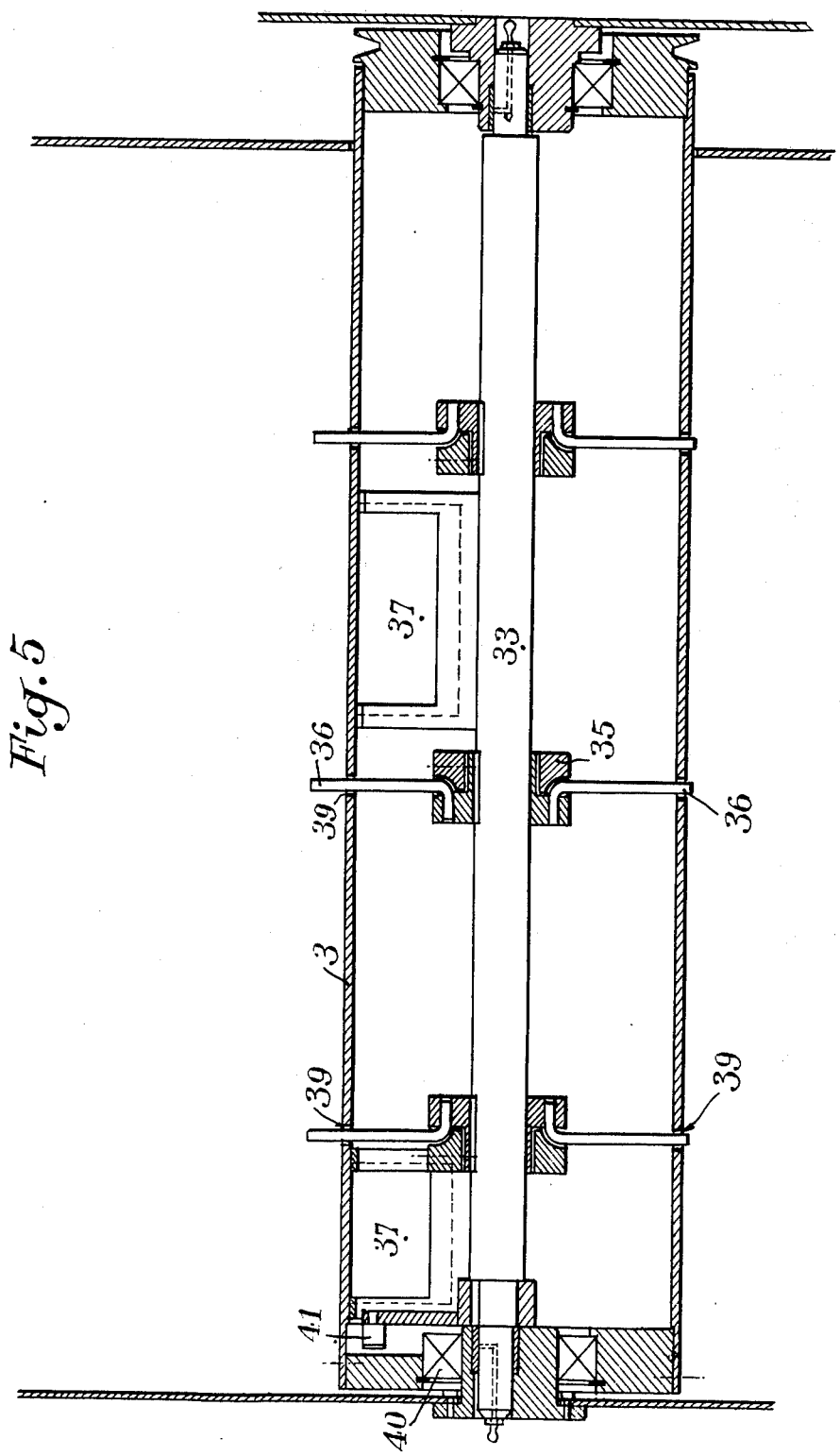
FIG. 5 is a longitudinal sectional view of the distributing cylinder.
Figure 6:
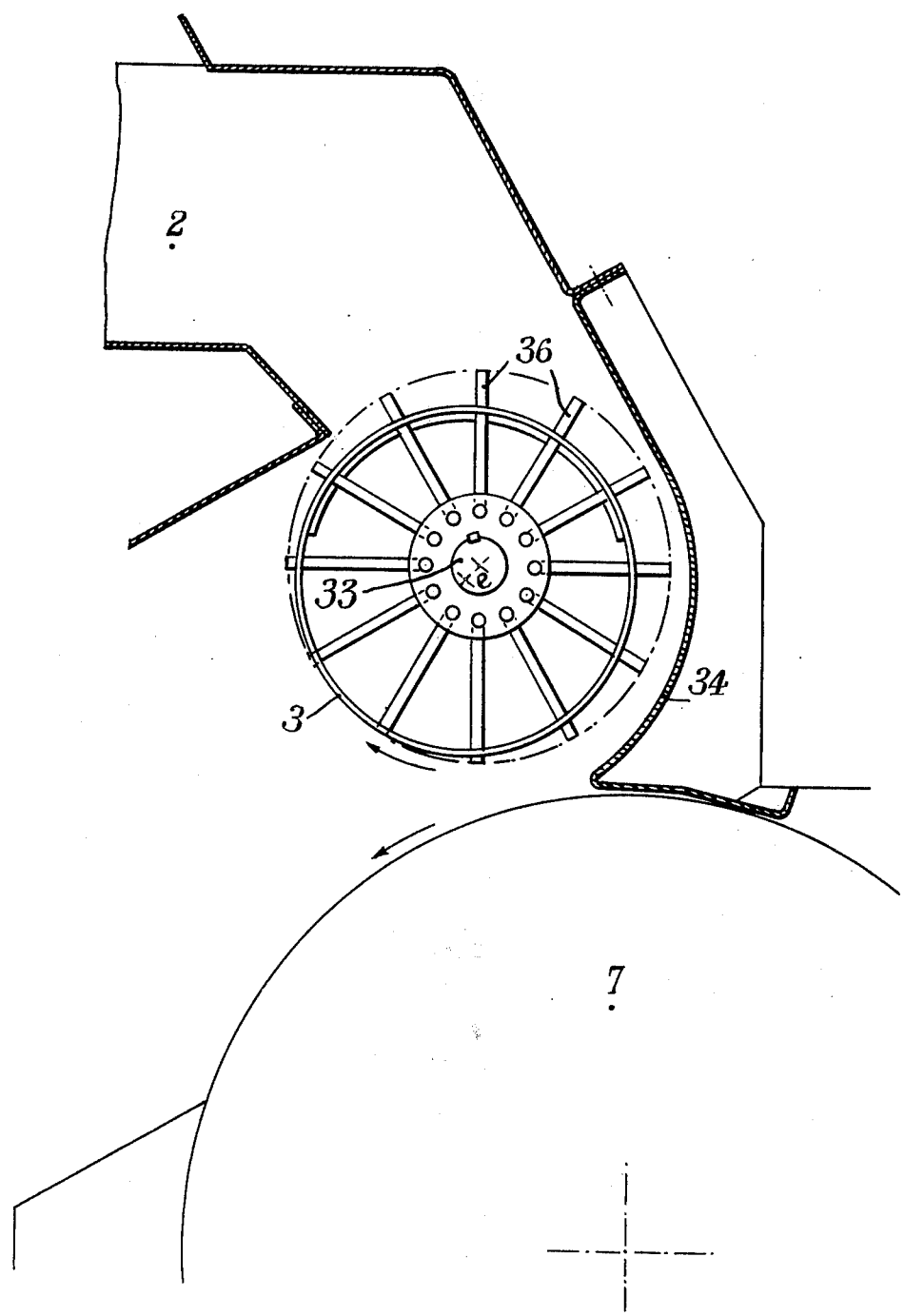
FIG. 6 is a cross-sectional view.
Figure 7:
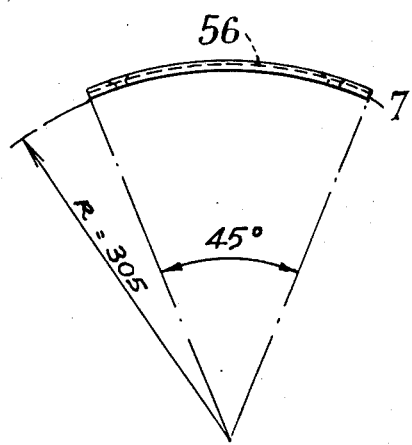
FIGS. 7 and 8 are elevational and top views of a sector of the thresher.
Figure 9:
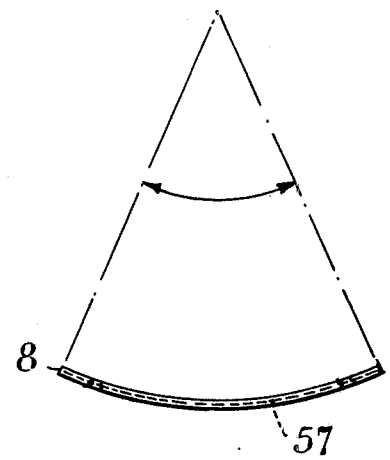
FIGS. 9 and 10 are similar views of a sector of the counter-thresher.
Figure 8:
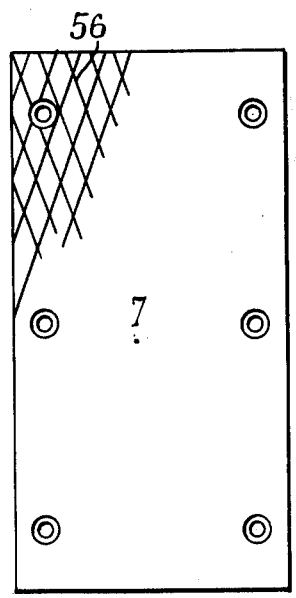
Figure 10:
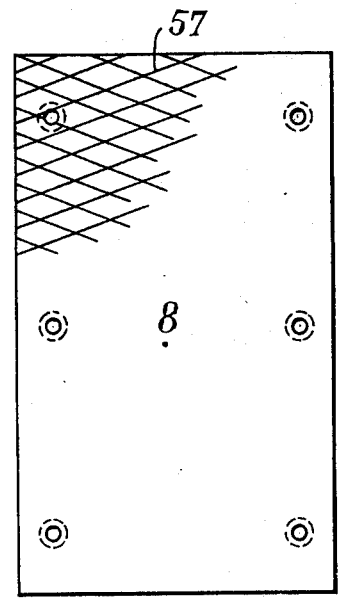

The distributing cylinder or feeder 3 ensures the regular feeding of the presser cylinder and avoids jamming of the ears (FIGS. 5 and 6).

This cylinder mounted on an excentric horizontal shaft 33 is housed between the fixed supply table 2 and the distributing box 34 of thresher 7, on its shaft 33 are fixed hubs 35 receiving radiating fingers 36 free to retract through holes 39 of the cylinder owing to the excentric motion e of cylinder 3 and shaft 33. Inspection holes 37 allow access to the inside of cylinder 3.

Shaft 33 is end mounted on bearings 40 and driven at 41 by means not shown.

Decompression baffle 12 allows the suction fan to be done away with which is found adjacent the presser cylinder on known machines.

Figure 1:
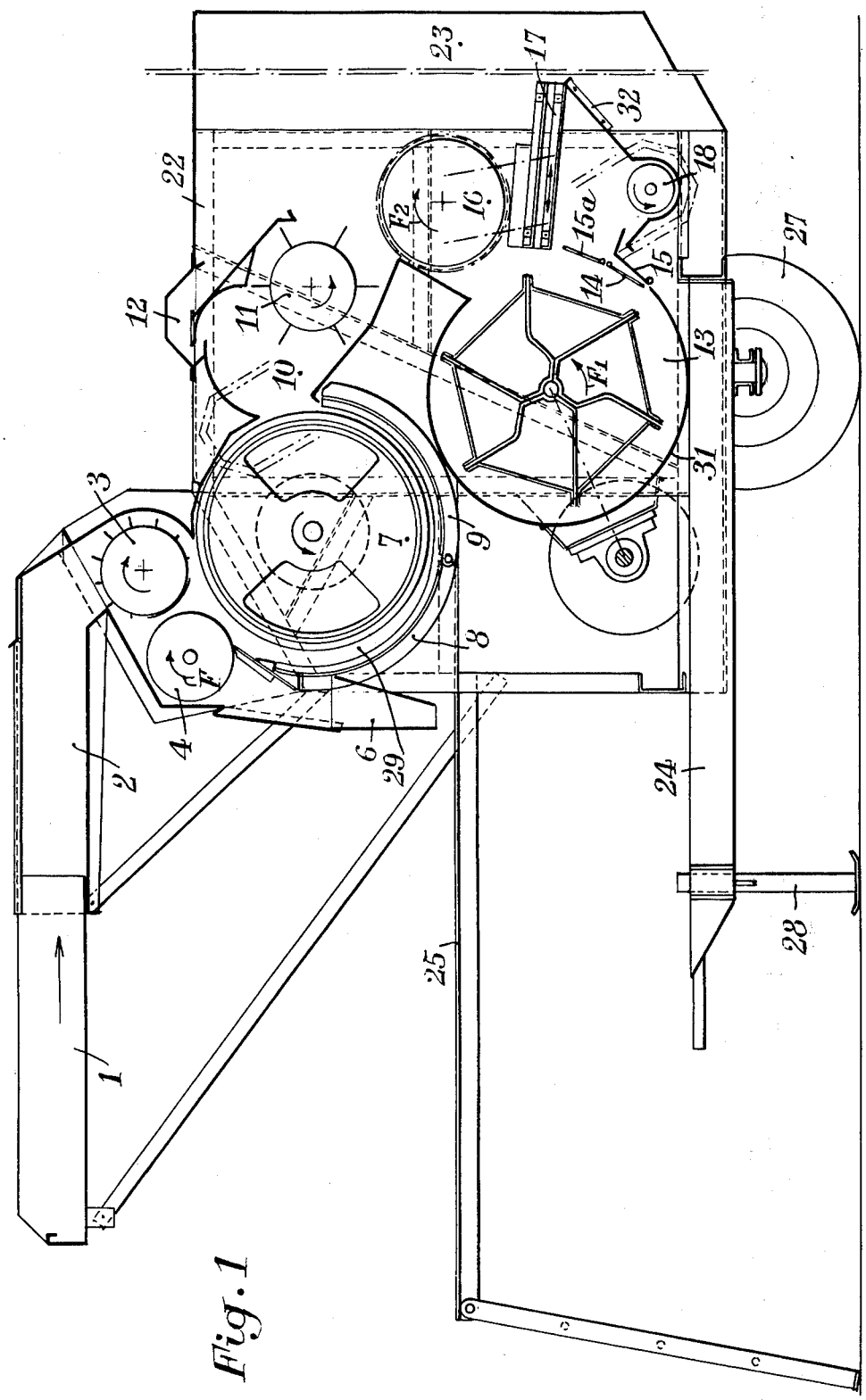
FIG. 1 is a schematic sectional view of the whole of a grain thresher according to a simplified embodiment.
Figure 2:
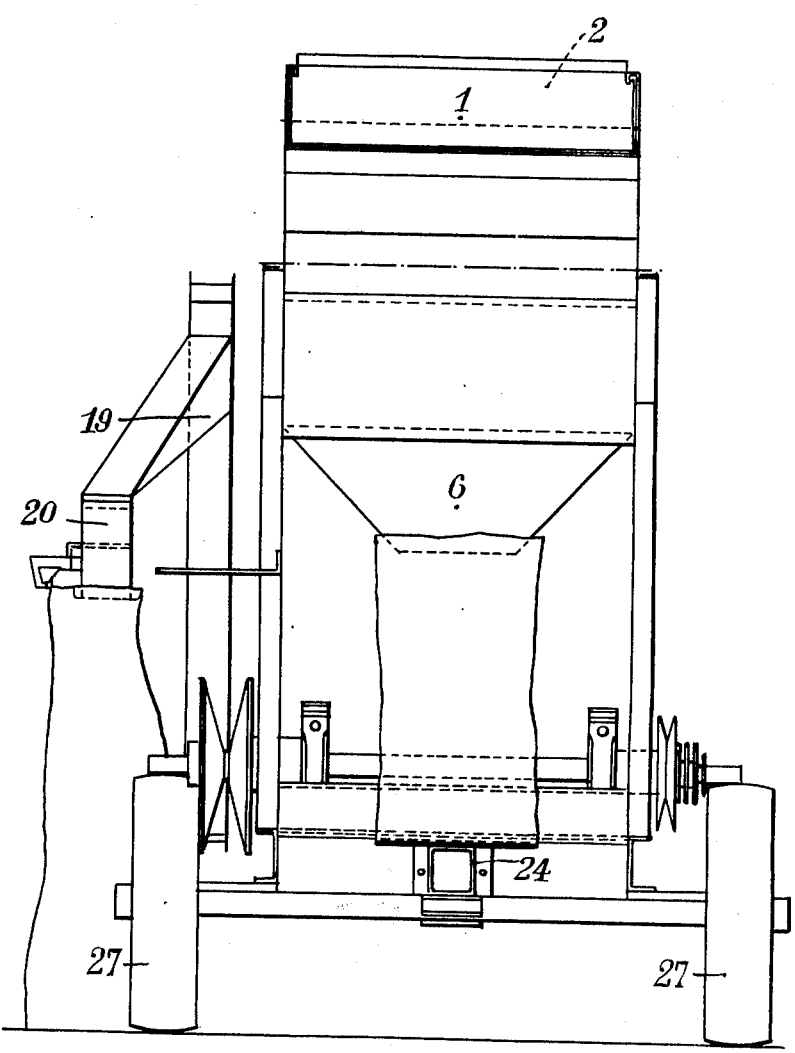
FIG. 2 is a corresponding end view.
Figure 3:
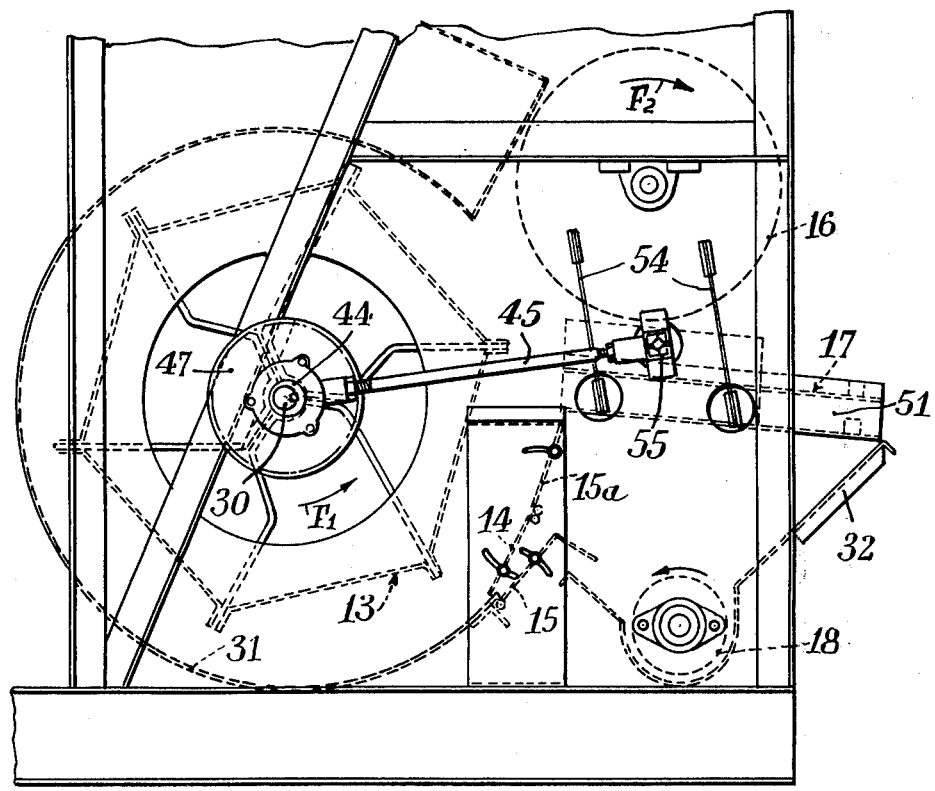
FIG. 3 is a view of the sieve and its fan.
Figure 4:
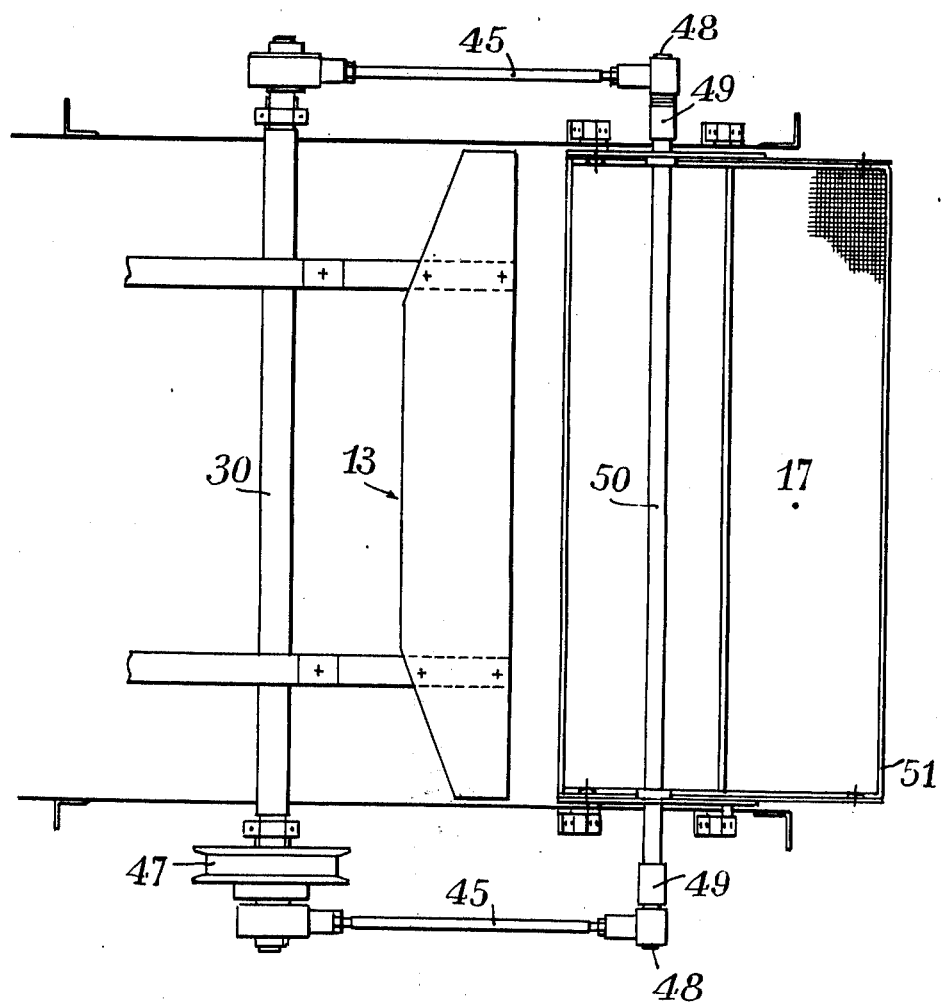
FIG. 4 shows a top view in partial section of the control of the sieve.

FIGS. 3 and 4 show the control of shaker sieve 17.

On shaft 30 controlling the rotation of fan 13 are fixed at each end an excentric 44 on which is hinged a link 45 whose head 48 controls by the coupling sleeve 49 the shaft 50 of the sieve.

The screens of sieve 17 are supported by a frame 51 carried on flexible blades 54 in a conventional manner and integral through bolt 55 with the head of the link.

47 indicates the drive pulley of the fan shaft.

FIGS. 7 to 10 show a constructional detail of the work surface of the thresher and counter thresher.

The surface of thresher 7 is cast in section with a latticed relief profile 56 whereas the surface of the counter thresher 8 also cast in section, has a profile in relief latticed in the opposite direction 57.

These beaters and counter beaters cast in section are bolt assembled on the frame of the counter thresher and on the drum of the thresher.

They avoid the use of latticing welded to the above supports, increase the working life of the wearing parts and avoid the considerable expense of replacing welded parts.

Owing to the provision of this unit, the ears brought by the supply table 2 are driven along by the retractable fingers 36 of distributing cylinder 3 housed in the casing 34 housing thresher 7. Thus jamming is avoided between feeder and presser and the ears flow without difficulty into space 29 between thresher 7 and counter thresher 8,9.

The grain separated from the ears in the thresher-counter thresher unit pass into a space communicating with the outside through ventilation hole 12, whereas the non fed products escape through chute 6.

The grains sorted in the straw-remover 16 are subjected to the blowing of a fan 13 situated nearby which ensures an excellent blast and a proper discharge of the straw.

The grain falls on to the flat screen sieve 17 actuated by the fan shaft whose second blowing portion completes the cleaning of the grain during its passage through the screens of this sieve.

Figure 11:
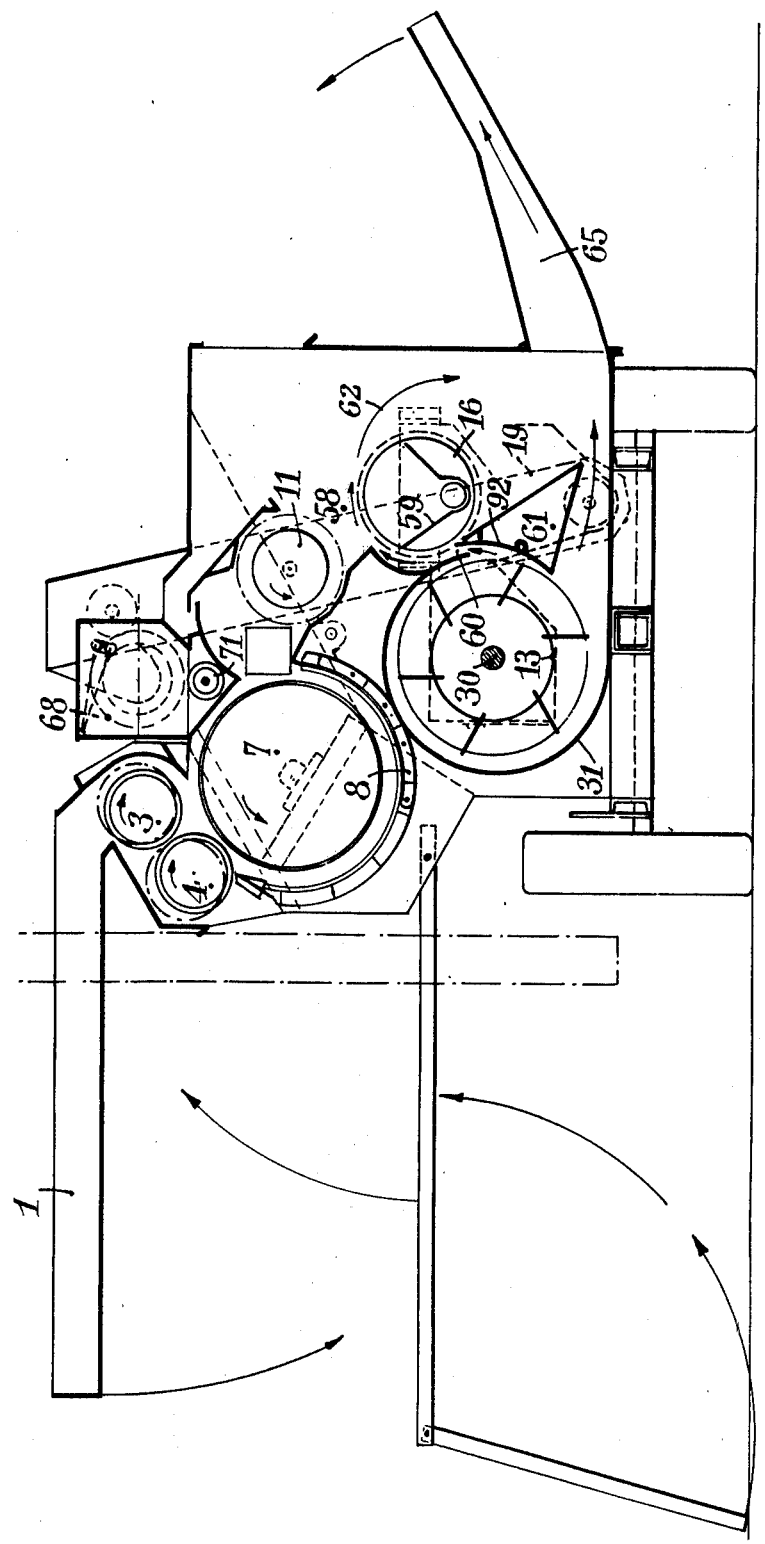
FIG. 11 is a schematic view of an improved thresher counter-thresher, straw-remover and sifter unit.
Figure 12:
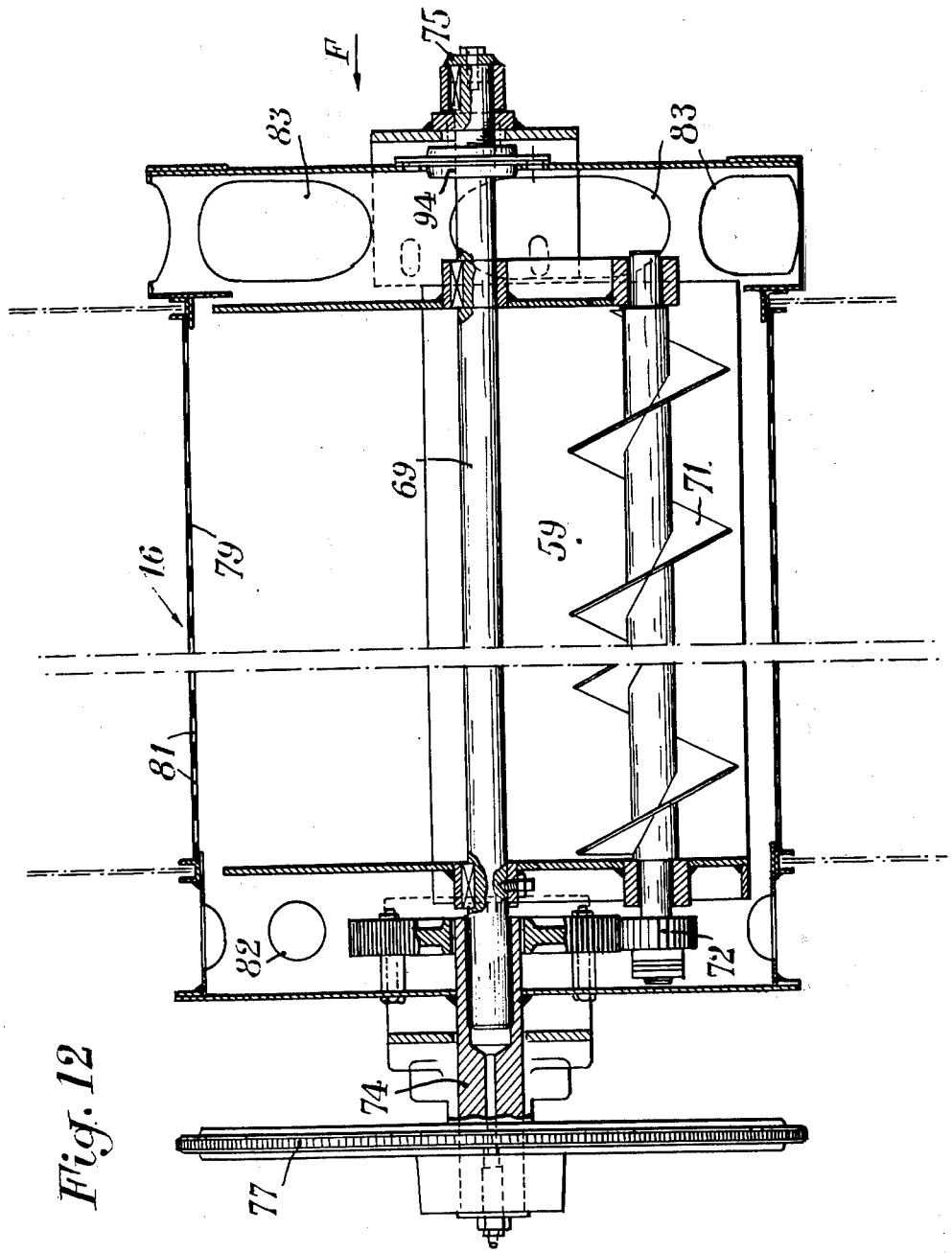
FIG. 12 is a cross-sectional view of the straw-remover.
Figure 13:
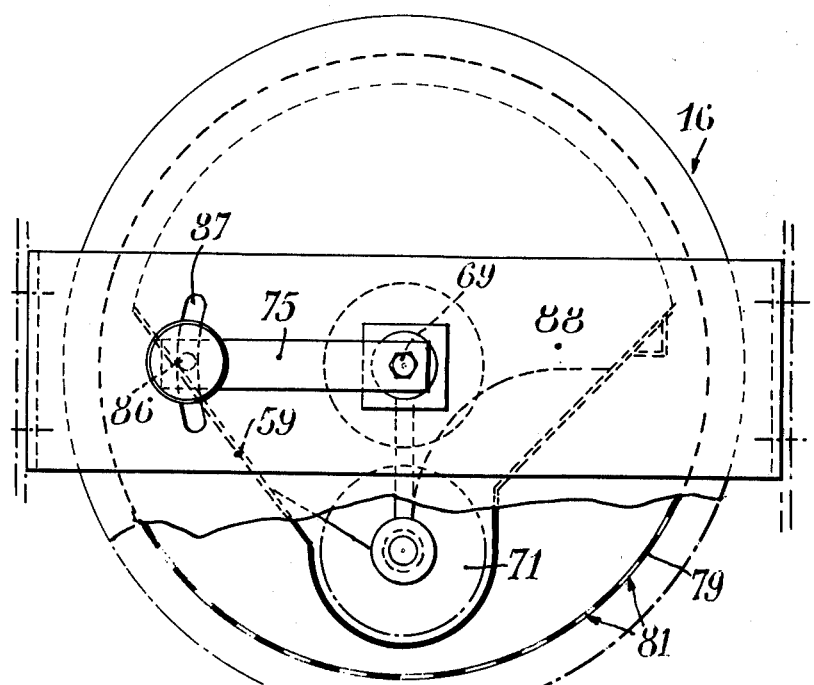
FIG. 13 is an end view of the straw-remover in the direction of arrow F of FIG. 12.
Figure 14:
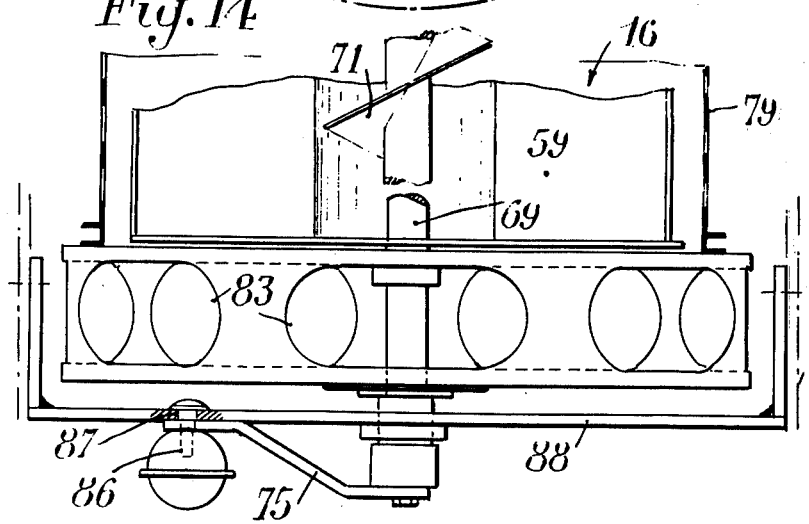
FIG. 14 is a detailed top view of the end of the trough of the straw-remover and of the trough tilting system.

In the variation shown in FIGS. 11 to 13, the air orientating shutters 14, 15 and 15a of the preceding embodiment have been omitted as well as the shaking sieve 17 and its accessories of FIGS. 3 and 4.

Straw-remover 16 has been modified in this sense that the latticed cylinder 79 rotated by sleeve 74 integral with gear wheel 77 is provided, on the driving side, with ventilation holes 82 and, on the opposite side, with oblong holes 83. The products fed from rotary air lock 11 are directed into space 58 reserved, between lock 11 and straw-remover 16, for ear rachis, threshed peduncles and dust refused by the latticed cylinder of the straw-remover and blown by the fan in the direction of arrow 62 towards discharge pipe 65 and the rest (threshed grain and badly threshed peduncles) penetrates into the straw-remover 16 through perforations 81 of latticed cylinder 79.

In order to facilitate the discharge of the straw and the ear rachis, the surrounding casing 31 has been transformed to serve two purposes by the addition of an appropriate opening: two paths are open to the current of pulsed air coming from fan 13, a large portion is directed into pipe 65, foldable for transport by road and receiving the straw coming from the straw-remover, and another portion is directed by pipe 60 on to straw-remover 16 by means of an adjustable shutter 92 hinged to nose 61.

The general drive is from shaft 30 of fan 13.

Supporting shaft 69 of straw-remover 16 supports a prismatic trough 59 and, in its lower parts, an endless screw 71 driven by intermediate gears 72 from sleeve 74 which serves as bearing for shaft 69: the sifted products are directed by this screw towards outlet appertures 83.

On shaft 69 bearing trough 59 is end mounted an external lever 75 whose head 86 is fixed in a slot 87 of cross-support 88 for tilting the trough.

Between the exit for products recovered by trough 59 and their entry into the foot of elevator 19, the greatest part of the semi-heavy products mixed with the grain are separated by a suction box 73 with baffle plates 91. This box serving as a separator is fitted over one of the suction inlets 92 of fan 13 causing the flow of products to be cleaned to be presented perpendicularly to a pulsed air-flow which passes therethrough and which recovers the light products.

This suction box is fitted with a sliding gate 89 for adjusting the suction strength of the fan.

Fan 13 fixed on general control shaft 30 is fitted with a disc 90 separating it into two parts, one directed towards straw discharge pipe 65 and towards pipe 60, the other towards baffle box 73.

Between the outlet of elevator 19 and bagging mouth 20 there is provided an optional sifter 68, for separating grains and badly threshed waste carried along by screw 18 of elevator 19.

Feed screw 67 of rotary sifter 68 is driven through a dog-clutch by sprocket and chain, the perforated tapered drum of sifter 68 lets grains pass which fall on to screw 71 and drives them through outlet 72 for bagging whereas the badly threshed peduncles, larger than the grains are refused by the perforations and flow at the rear of the sifter into the thresher chamber. Thus is obtained an automatic return to the thresher of badly threshed products mixed with the good grains delivered by the bagging elevator 19.

Another improvement of the invention consists in forming feed table 1,2 in one and the same unit capable of pivoting about an axis so as to be vertically foldable for transport and capable of being raised horizontally by the set of props in the operating position.

Finally the wheels and the boom are disposed in planes parallel to the thresher and to the fan so as to remain coupled to the universal joint not only in the road position but also in the operating position; the machine is thus protected, on the one hand, by two wheels located on each side of the bagging station 20 and by its boom resting on the draw-bar of the tractor.

In the embodiment of FIGS. 19 and 20, on shaft 7a driven from drive shaft 30 of fan 13 is mounted an excentric 93 controlling an adjustable telescopic rod 94 hinged at its other end to shaft 96 of an arm 97 driving in reciprocal vertical motion through shaft 99 a shaker comb 98 with horizontal teeth 100 preferably bent or curved housed in space 58 downstream of rotary air lock 11 and upstream of straw-remover 16.

The adjustment of the length of rod 94 allows the more or less large average distance apart of the teeth of the comb to be adjusted in the upper part of straw-remover 16.

The displacement of drive point 96 of rod 94 on arm 97 permits the more or less great shaking amplitude to be varied according as to whether this drive point is further away or nearer shaft 99.

What is claimed as new is:

1. Cereal grain thresher comprising a grain supply chute, a rotatable feeder provided with retractable pins, a presser cylinder for engaging the fed grains rotatable in the same direction and at the same rate as said feeder, a thresher cylinder rotatable in a direction opposed to the direction of rotation of said feeder and presser cylinder, a fixed concave surrounding said thresher cylinder, a chamber disposed beyond said thresher cylinder for recovering the threshed grains, a rotary air lock mounted in said chamber, a pressure-release baffle overlying said rotary air lock, a straw-remover disposed beyond said rotary air lock rotatable in a direction opposed to that of said rotary air lock, a horizontal-axis blade-fan disposed on one side of said straw-remover, a discharge conduit at the outlet end of said straw-remover, and means for distributing the air blown by said fan between said straw-remover and said discharge conduit.

2. Cereal grain thresher comprising a grain supply chute, a rotatable feeder provided with retractable pins, a presser cylinder for engaging the fed grain rotatable in the same direction and at the same rate as said feeder, a thresher cylinder rotatable in a direction opposed to the direction of rotation of said feeder and presser cylinder, a fixed concave surrounding said thresher cylinder, a chamber disposed beyond said thresher cylinder for recovering the threshed grains, a rotary air lock mounted in said chamber, a pressure-release baffle overlying said rotary air lock, a straw-remover disposed beyond said rotary air lock rotatable in a direction opposed to that of said rotary air lock, said straw-remover comprising a latticed drum mounted on a transverse horizontal shaft, a sleeve rigid with one end of said shaft, means for rotatably driving said sleeve, a prismatic trough carried by said shaft, an auger mounted at the bottom of said trough parallel to the drum axis and driven from said drum, and elongated outflow apertures provided on one side of said drum for communication with said trough, a horizontal-axis blade fan disposed on one side of said straw-remover, a discharge conduit at the outlet of said straw-remover, and means for distributing the air blown by said fan between said straw-remover and said discharge conduit.

3. A grain thresher as claimed in claim 2, wherein a lever is secured to one end of the trough-supporting shaft for adjusting the trough inclination.

4. A grain thresher as claimed in claim 2, wherein a baffle-box and a regulating valve are disposed in the base of said straw-remover in the suction area of the air stream blown by said fan.

5. A grain thresher as claimed in claim 2, which comprises a toothed shaker comb adapted to be reciprocated in a vertical direction and mounted between said rotary air lock and said straw-remover.

6. A grain thresher as claimed in claim 6, comprising means for driving said comb and means for varying the position of said comb in relation to said straw-remover.

7. A grain thresher as claimed in claim 6, comprising an eccentric keyed on a shaft of said fan, an adjustable telescopic rod controlled by said eccentric, an arm pivoted to an adjustable point of said rod, said comb being connected to and responsive to movement of said arm, and curved horizontal teeth carried by said comb.

* * * * *